United States Patent [19]

Maruya

[11] Patent Number: 4,487,862

[45] Date of Patent: Dec. 11, 1984

[54] THERMOSETTING RESIN COMPOSITION FOR INJECTION MOLDING AND ARTICLE FORMED BY USING THE COMPOSITION

[75] Inventor: Kazuo Maruya, Yokosuka, Japan

[73] Assignee: Nissan Motor Company, Limited, Yokohama, Japan

[21] Appl. No.: 470,373

[22] Filed: Feb. 28, 1983

[30] Foreign Application Priority Data

Mar. 12, 1982 [JP] Japan ................................ 57-38066
Mar. 12, 1982 [JP] Japan ................................ 57-38065

[51] Int. Cl.$^3$ ............................................. C08K 3/32
[52] U.S. Cl. .................................. 523/506; 524/413; 524/414; 524/416; 524/417; 524/404
[58] Field of Search ............... 524/413, 414, 416, 417, 524/404; 523/506

[56] References Cited

U.S. PATENT DOCUMENTS

| | | | |
|---|---|---|---|
| 2,809,946 | 10/1957 | Blegen et al. ..................... | 523/506 |
| 3,201,369 | 8/1965 | Dell et al. ......................... | 524/413 |
| 4,013,599 | 3/1977 | Strauss et al. ..................... | 524/416 |

FOREIGN PATENT DOCUMENTS

| | | |
|---|---|---|
| 2420093 | 11/1974 | Fed. Rep. of Germany . |
| 2512318 | 9/1976 | Fed. Rep. of Germany . |
| 1055637 | 1/1967 | United Kingdom . |
| 1124322 | 8/1968 | United Kingdom . |
| 1226731 | 3/1971 | United Kingdom . |
| 1248364 | 9/1971 | United Kingdom . |
| 1601131 | 10/1981 | United Kingdom . |

OTHER PUBLICATIONS

"Hochmolekularbericht 1981", Article No. H5830/81 (1981).

*Primary Examiner*—Lewis T. Jacobs
*Attorney, Agent, or Firm*—Schwartz, Jeffery, Schwaab, Mack, Blumenthal & Koch

[57] ABSTRACT

A resin composition for injection molding, composed essentially of 100 parts by weight of a thermosetting resin such as phenolic resin or unsaturated polyester resin, 5–250 parts by weight of a salt of an oxyacid of phosphorus and 15–245 parts by weight of a filler which is preferably inorganic, on condition that the total amount of the oxyacid salt and the filler is in the range from 20 to 250 parts by weight. Preferably the oxyacid salt is a phosphate, especially a polyphosphate, expressed by $MO_{m/2} \cdot nP_2O_5$, where M is a metal element including Si, m is the valence of the metal M, and n is in the range from 0.1 to 0.7, or an alkali metal salt of such a phosphate. This composition gives moldings that are very high in thermal stability. As a typical application, a fully practicable reflector for automobile head lamps is produced by providing a body molded by using this composition with a metal film by vacuum deposition.

12 Claims, 3 Drawing Figures

THERMOSETTING RESIN COMPOSITION FOR INJECTION MOLDING AND ARTICLE FORMED BY USING THE COMPOSITION

BACKGROUND OF THE INVENTION

This invention relates to a thermosetting resin composition for injection molding and an article having a body formed by injection molding of the resin composition and a metal coating film formed by vacuum deposition.

Both thermoplastic resins and thermosetting resins have been used as molding materials for producing various articles. However, the resins of both types are inferior in heat resistance to metal materials, and this shortcoming has limited the application of the resin materials. More particularly, thermoplastic resins used as molding materials are mostly below about 180° C. in heat distortion temperature, and even certain thermoplastic resins of which the heat distortion temperature is above 180° C. are not higher than 180° C. in glass transition temperature and, therefore, undergo some changes in the dimensions of the molded articles when long used at temperatures higher than the glass transition temperature. Some popular thermosetting resins such as phenolic resins and unsaturated polyester resins are 190°-200° C. or above in heat distortion temperature, but, neverthless, moldings of these thermosetting resins cannot said to be chemically stable at temperatures up to the heat distortion temperature because the moldings liberate some gases even when kept at relatively lower temperatures such as 120°-150° C.

The liberation of gases from the moldings becomes a serious problem particularly when the moldings are provided with coating films formed by painting or vacuum deposition, because the gases liberated from the heated moldings produce pressures at the interface between the molded resin body and the coating film and often cause blistering or even peeling of the coating film. For example, when a lamp reflector experimentally produced by coating a molded body of a novolak-type phenolic resin base composition with a base coat of a resin, a metal film formed by vacuum deposition and a top coat of a resin was kept at about 150° C., significant blistering of the metal film and the top coat was observed within one hour. Similar blistering phenomena were observed also when resol-type phenolic resin and unsaturated polyester resin were individually used as the material of the reflector body. Additionally it was confirmed that post curing of the molded reflector body prior to the application of the base coat had the effect of somewhat raising the temperature at which the subsequently deposited metal film blistered within one hour. However, even in that case the blistering occurred within one hour at temperatures below the heat distortion temperatures of the employed thermosetting resins, and from an industrial point of view the post curing of the molded bodies is a time- and energy-consuming treatment which is desired to be omitted in order to reduce the production cost. Also it was confirmed that the blistering temperature could be rendered somewhat higher by raising the mold temperature and/or prolonging the curing time in the injection molding operation, though unfavorable for efficiency of the operation.

From these experimentally confirmed facts, a primary reason for the blistering phenomenon is presumed to be incompleteness of the curing reaction of the thermosetting resin, i.e. condensation polymerization reaction in the case of a phenolic resin, subjected to injection molding to result in the existence of unreacted organic materials in the moldings. When the moldings or articles produced by using the moldings are kept at high temperatures the unreacted materials will undergo polymerization reaction with formation of some gaseous substances. In an experiment with respect to novolak-type phenolic resin which is one of the most popular modling materials and is cured usually by using hexamethylenetetramine as curing agent, the liberation of ammonia gas from a heated molding was so significant that blow-holes produced in a base coat layer on the molding were clearly perceptible with the naked eye. Besides the gases formed by condensation polymerization reaction, moisture and/or certain organic volatile substances existing in the molded articles are considered to turn into gases that cause the blistering because the blistering phenomenon occurs even when the molding material is unsaturated polyester resin that cures by addition polymerization reaction.

Meanwhile, in the automobile industry it has been tried to produce reflectors for lamp units such as head lamp units by injection molding of a thermosetting resin firstly because at present the freedom of designing the shape of the lamp reflectors are restricted by the limitations to the deep drawing for shaping the conventionally used sheet metals and secondly it is desired to reduce the weight of each reflector for the purpose of reducing the gross weight of the vehicle. However, relatively low heat resistance of thermosetting resins compared with metals has offered serious problems to the development of the resin base reflectors since the reflectors are required to be high in thermal stability.

In automobile head lamp units, for example, the surface temperature of the reflector often becomes above 150° C. and reaches 200° C. or higher in some areas because of a relatively small volume of the space in each lamp unit relative to the power of the lamp and, in some cases, also because of a short distance between the lamp and the reflector surface. Therefore, the liberation of considerable amounts of gases from the molded reflector body during operation of the lamp becomes a serious disadvantage. The insufficiency of the thermal stability of the molded reflector body leads to not only destruction of the interlaminar adhesion of the coating films but also to significant lowering in the reflectivity of the reflector surface and lowering in the mechanical strength of the reflector body itself.

As mentioned hereinbefore, it is unfavorable for industrial production of the resin base reflectors to perform post curing of the molded reflector bodies to thereby enhance the thermal stability of the reflector bodies. As a different way of obtaining resin base reflectors in which the blistering temperature becomes about 180° C. or higher and the blistering becomes relatively small in scale, it has been tried to use a certain unsaturated polyester base molding compound of wet premix type, particularly a so-called bulk molding compound of low shrinkage class, as the molding material for the reflector bodies. However, wet premix compounds of this class are relatively high in specific gravity and, as a more serious disadvantage, are inferior in workability or moldability in injection molding processes and difficult to mold into intricately shaped bodies that are high in the surface precision.

SUMMARY OF THE INVENTION

It is an object of the present invention to provide a thermosetting resin composition for injection molding, which gives moldings that are high in stability and flexural strength even at considerably high temperatures without the need of post curing of the moldings and accordingly is suitable for the production of lamp reflectors for automobile head lamp units for example.

It is another object of the invention to provide an article which has a body formed by injection molding of a thermosetting resin composition and a metal coating film formed by vacuum deposition and can endure high temperatures without exhibiting significant thermal distortion and without suffering from blistering of the metal film.

The present invention provides a resin composition for injection molding, which comprises 100 parts by weight of a thermosetting resin, 5 to 250 parts by weight of a salt of an oxyacid of phosphorus and 15 to 245 parts by weight of a filler on condition that the total amount of the salt of the oxyacid and the filler is in the range from 20 to 250 parts by weight.

Preferably a phenolic resin or an unsaturated polyester resin is used as the thermosetting resin. Preferably the salt of the oxyacid is a phosphate expressed by the general formula $MO_{m/2} \cdot nP_2O_5$, where M represents a metal element including Si, m represents the valence of the metal element M and n is in the range from 0.1 to 0.7, or an alkali metal salt of the phosphate. Preferred examples of such phosphates are silicon polyphosphate, aluminum polyphosphate, boron polyphosphate and alkali metal salts thereof. Preferably the filler is selected from inorganic filler materials such as carbon, glass, silica, mica and calcium carbonate in the form of powder and/or fiber.

To enhance the thermal stability of the moldings without sacrificing the moldability or flow properties of the molding composition, it is suitable that the amount of the phosphate is at least 30 parts by weight, and preferably in the range from 60 to 100 parts, per 100 parts of the thermosetting resin while the total amount of the phosphate and the filler is in the range from 120 to 180 parts by weight.

It is optional but is preferable to add an adequate amount of a mold release agent such as a metal stearate to the composition according to the invention.

The principal feature of the composition of the invention is the presence of a salt of an oxyacid of phosphorus in combination with a thermosetting resin. In this composition the oxyacid salt promotes the polymerization reaction of the thermosetting resin during injection molding of the composition with the effect of greatly reducing the amounts of organic materials remaining unreacted in the obtained moldings. Therefore, the moldings are very high in thermal stability: they can endure high temperatures without exhibiting significant thermal distortion and without liberating a considerable quantity of gas. When the moldings are provided with a metal film formed by vacuum deposition, the exposure of the moldings to high temperatures (of course below the heat distortion temperature of the thermosetting resin used in the molding composition) do not cause blistering of the metal film.

In another aspect, this invention provides an article comprising a body formed by injection modling of a resin composition according to the invention and a metal coating film formed by vacuum deposition.

A typical embodiment of such an article of the invention is a reflector for a lamp unit such as an automobile head lamp unit. In this case it is usual to interpose a base coat formed by using resin base paint or varnish between the molded body and the metal film and to coat the outer surface of the metal film with a top coat by using a clear paint or varnish. Owing to the above described effects of the oxyacid salt in the molding composition, the reflector can endure high temperatures up to the heat distortion temperature of the thermosetting resin used in the molding composition without suffering from blistering of the metal film and without undergoing significant changes in the reflectivity of the reflector surface or in the dimensions of the reflector body. From an industrial point of view, it is an additional advantage of this reflector that the injection molding of the reflector body encounters little difficulty and needs not to be followed by an after-cure process.

DESCRIPTION OF THE PREFERRED EMBODIMENTS

There are a wide variety of thermosetting resins that are useful for a molding composition according to the invention. More particularly, phenolic resin, epoxy resin, furan resin, xylene-formaldehyde resin, ketone-formaldehyde resin, urea resin, melamine resin, melamine-phenol copolycondensation resin, modified phenolic resin, alkyd resin, unsaturated polyester resin, modified unsaturated polyester resin, diallyl phthalate resin and urethane resin are all useful. If desired it is possible to use two or more kinds of thermosetting resins jointly. However, it is preferred to use either phenolic resin or unsaturated polyester resin by collective consideration of the productivity, workability and heat resistance of the molding composition.

As regards phenolic resin, novolak-type resins are preferable to resol-type resins. Novolak-type phenolic resin, which is a solid resin sometimes called a two-stage resin because of requiring the presence of an aldehyde to undergo further polymerization or curing, is suited to dry blending for preparation of a molding composition, relatively easy to control the polymerization reaction and to obtain a uniform product and is capable of giving a molding composition which exhibits a good flow property and cures rapidly. Furthermore, moldings obtained by using that molding composition are generally low in molding shrinkage and post shrinkage and excellent in their gloss, mechanical strength and heat resistance. It is usual to use hexamethylenetetramine as curing agent for a novolak-type phenolic resin employed in the present invention, but it is also possible to alternatively use a different kind of known curing agent such as paraformaldehyde or a suitable epoxy compound. Resol-type phenolic resin, sometimes called a one-stage resin, is inherently capable of cross-linking itself and, hence, is relatively difficult to control the condensation polymerization reaction and tends to gradually undergo curing even during storage. On condition that suitable countermeasures are taken against such problems, it is possible to use a resol-type phenolic resin in the present invention with good results.

As regards unsaturated polyester resin, it is convenient to use a dry premix prepared by adding a solid cross-linking agent such as diallyl phthalate prepolymer and a peroxide that serves as catalyst to a solid and medium-reactivity prepolymer of unsaturated polyester. Although either diallyl phthalate prepolymer or diallyl isophthalate prepolymer can singly be employed as the thermosetting resin in a molding composition according to the invention with the addition of a peroxide that serves as catalyst, usually it is preferable to use such a prepolymer jointly with an unsaturated polyester.

A salt of oxyacid of phosphorus as the characteristic component of a molding composition according to the invention can be selected from various phosphates such as silicon polyphosphate, alkali metal salt of silicon polyphosphate, aluminum polyphosphate, alkali metal salt of aluminum polyphosphate, boron polyphosphate, alkali metal salt of boron polyphosphate, titanium phosphate, zirconium phosphate, aluminum phosphate, calcium phosphate, magnesium phosphate, zinc phosphate, barium phosphate, lead phosphate and sodium phosphate. If desired two or more of these phosphates may be used jointly. In these phosphates the phosphoric acid component may be in the form of orthophosphoric acid, metaphosphoric acid or tripolyphosphoric acid, or in the form of a still differently condensed phosphoric acid, but in general it is desirable that the phosphoric acid component is in a highly condensed state. The above named phosphates may be either acidic phosphates or basic phosphates.

A salt of an oxyacid of phosphorus is expressed by the formula $MO_{m/2} \cdot nP_2O_5$, where M represents a metal element including Si, and m represents the valence of the metal M. In the present invention it is suitable to use a salt of which n in this formula is in the range from 0.1 to 0.7, and preferably in the range from 0.2 to 0.5. It is especially desirable to use silicon polyphosphate or its alkali metal salt, and secondly to use either aluminum polyphosphate or its alkali metal salt or boron polyphosphate or its alkali metal salt.

As to the proportion of the salt of oxyacid of phosphorus (hereinafter will be referred to as phosphate for brevity) to the thermosetting resin in the molding composition, it is important that the phosphate amounts to 5 to 250% by weight of the thermosetting resin. If the amount of the phosphate is less than 5% by weight of the thermosetting resin the favorable effects of the phosphate remain insufficient. However, increasing the phosphate beyond 250% by weight of the thermosetting resin scarcely brings about further enhancement of the favorable effects of the phosphate and, moreover, produces an adverse effect that the molding composition becomes lower in its fluidity in injection modling processes as a probable cause of lowering in the surface precision of the obtained moldings. Where the moldings are required to be highly stable at high temperatures as in the case of lamp reflectors, it is desirable that the phosphate in the molding composition amounts to at least 30% by weight of the thermosetting resin. In general it is preferred that the amount of the phosphate in the molding composition is in the range from 60 to 100% by weight of the thermosetting resin firstly because the favorable effects of the phosphate on the heat resistance of the moldings nearly maximize as the amount of the phosphate nears 100% of the thermosetting resin and secondly because it is easy to uniformly mix the phosphate and the thermosetting resin in such proportions and, consequently, to obtain molding compositions of which the properties exhibit little variation or dispersion.

The filler as another indispensable component of a molding composition according to the invention is broad in scope and includes ones commonly used as reinforcing materials. In the present invention inorganic fillers are preferred to organic fillers because organic fillers are generally inferior in their heat resistance and mostly contain moisture or other volatile matter and, hence, are liable to adversely affect the stability and heat resistance of moldings obtained by utilizing the invention. However, some organic fillers such as wood powder or pulp prepared under strict control of moisture content can be used in this invention.

Examples of inorganic fillers useful in this invention are clay, talc, glass, silica, alumina, magnesia, titania, calcium silicate, kieselguhr, calcium carbonate, graphite, carbon black, mica and various metals. Powders, flakes and fibers of these filler materials are of use. Where it is intended to produce moldings high in mechanical strength, it is suitable to employ an inorganic filler in the form of fiber or chopped strands. To enhance the heat resistance of the moldings as is particularly desired in the case of lamp reflectors, it is effective to use an inorganic filler which is high in heat conductivity and small in coefficient of linear expansion. High heat conductivity of the filler is effective for promotion of the dissipation of heat from the moldings subjected to heating and also for narrowing of the width of temperature variations in various portions of the individual moldings, while smallness of the coefficient of linear expansion of the filler is effective for enhancement of the dimensional stability of the moldings subjected to heating. In a molding having a metal coating layer formed by vacuum deposition, such as a lamp reflector, the use of a filler small in the coefficient of linear expansion has the effect of lessening the thermal stress produced between the resin body of the molding and the metal coating layer when the molding is heated. By consideration of the stability and heat resistance of the moldings the most suitable filler is either carbon fiber or graphite fiber, and glass fiber, glass powder, graphite powder and carbon powder can be named in the next place. Where it is desired to produce a molding having a very smooth surface as in the case of a lamp reflector which is required to have a highly reflective surface, it is suitable to employ mica as the filler material. If necessary or desired, two or more kinds of filler materials can be used jointly.

In a molding composition of the invention, the amount of the filler is required to be in the range from 10 to 245% by weight of the thermosetting resin. Where it is intended to produce intricately shaped moldings it is desirable that the amount of the filler in the molding composition does not exceed 200% by weight of the thermosetting resin with a view to maintaining good moldability of the composition and to affording smooth surfaces to the moldings. Furthermore, it is suitable to determine the amount of the filler with consideration of the amount of the above described phosphate too, because the phosphate serves as a filler besides its principal function as a thermal stabilizer. Therefore, it is additionally required that the total of the phosphate and the filler in the molding composition be in the range from 20 to 250% by weight of the thermosetting resin. When the total of the phosphate and the filler is less than the lower boundary of this range, moldings given by the molding composition are insufficient in their mechanical strength and heat resistance, and particularly in bending strength at high temperatures. When the total of the phosphate and the filler is more than 250% by weight of the thermosetting resin, the molding composition becomes low in its fluidity in injection molding processes and therefore it becomes difficult to obtain moldings satisfactorily high in surface precision besides some difficulties offered to the molding operation. Where it is intended to produce lamp reflectors or any other moldings very high in thermal stability, it is desirable that the total of the phosphate and the filler in the molding composition amounts to at least 40% by weight of the thermosetting resin. In general, it is preferred that the total amount of the phosphate and the filler in a molding composition of the invention is in the range from 120 to 180% by weight of the thermosetting resin, because within this range the fluidity of the composition under injection molding and the mechanical strength of the obtained moldings become best balanced.

Though optional, it is recommendable to add a mold release agent to a molding compoition of the invention with a view to facilitating removal of the moldings from the molds. It is possible to use any of conventional mold release agents for similr purposes, but it is preferred to use either zinc stearete or calcium stearate. When the thermosetting resin in the molding composition is either a phenolic resin or an unsaturated polyester resin, zinc stearate is the most suitable mold release agent to be added by consideration of the injection temperature of the molding composition. In any case a suitable range of the amount of the added mold release agent is from 0.5 to 3% by weight of the total of the above described essential components of the molding composition.

In the case of externally applying a mold release agent to the molds for injection molding of a composition according to the invention, care should be taken with due consideration of the possibility of lowering in the surface precision of the moldings by the influence of the applied mold release agent and also the possibility of degrading of the wettability of the moldings with paints that are sometimes used for coating of the moldings.

Basically a molding composition according to the invention is prepared by blending of suitable amounts of the above described thermosetting resin, phosphate and filler together, optionally with the addition of a mold release agent. It is important to carry out thorough mixing so as to achieve uniform dispersion of every ingredient. In practice it is usual to process the molding composition obtained by the mixing process into a granular form for the purpose of facilitating the feed of the molding composition to injection molding machines. Either a dry process or a wet process can be employed for the preparation of the molding composition. In a usual dry process the ingredients are initially blended together and well mixed in a suitable mixer or a blender such as a ribbon blender or a V-shaped blender, and the obtained mixture is granulated by the steps of kneading the mixture at an elevated temperature by means of rolls or a suitable kneader, cooling the kneaded mixture to obtain a solid mass of the molding composition and then crushing the solid mass. It is also possible to simultaneously accomplish the mixing and kneading in heated state by using a Henschel mixer or the like and to perform the granulation successively. In the case of a wet process, it is important to remove the solvent and/or water from the blended and kneaded composition as much as possible. If use is made of a wet premix of a thermosetting resin and filler, a wet kneading operation is carried out so as to uniformly disperse the added phosphate in the wet premix. The kneading of the molding composition in a wet process is usually performed by means of a kneader.

Injection molding of a molding composition according to the invention can be performed by using conventional injection molding machines for thermosetting resins, and it is possible to produce variously shaped articles. If necessary the moldings are subjected to post curing in a known manner.

In the case of producing a lamp reflector by using a molding composition of the invention, a reflector body formed by injection molding is subjected to a surface treatment process, which usually consists of the steps of applying a base coat to the surfaces of the molded reflector body, producing a reflective surface by vacuum deposition of a suitable metal such as aluminum on the base coat and finally applying a top coat. The base coat serves the purposes of smoothing the surfaces of the molding reflector body to ensure firm adhesion of the metal film formed in the subsequent vacuum deposition step and suppressing liberation of gases from the molded reflector body during the vacuum deposition operation. As the material for the base coat, a paint sufficiently high in heat resistance is selected from urethane base paints, polyester base paints and melamine-alkyd base paints for example. The base coat is formed usually by spray coating, and it is desirable to perform the coating in a clean room of which the interior is maintained at a pressure slightly above the atmospheric pressure outside the clean room. It is also possible to form the base coat by means of a flow coater. After the coating operation the paint film is dried and baked. It is suitable that the film thickness of the base coat is in the range from about 10 $\mu$m to about 20 $\mu$m.

In a desired area of the reflector body a reflective metal film is formed on the base coat by either vacuum evaporation or sputtering. When the metal to be deposited is aluminum it is preferable to employ a vacuum evaporation method in regard to the gloss of the deposited metal film, rate of deposition and cost of the deposition process. In the case of depositing a metal relatively hard to evaporate, such as chromium or stainless steel, it is recommended to employ a sputtering method. It is suitable that the thickness of the deposited metal film is in the range from about 500 Å to about 3000 Å.

Finally a top coat layer is formed on the reflective metal film by using a clear paint which is sufficiently high in heat resistance. It is suitable that the film thickness of the top coat is in the range from about 5 $\mu$m to about 15 $\mu$m.

A lamp reflector produced in this manner by using a molding composition of the invention is very high in thermal stability. Even under high temperature conditions as created in automotive head lamp units, this reflector scarcely undergoes distortion or significant decrease in weight and does not suffer from blistering phenomenon. Moreover, this reflector is very small in the extent of a change in its reflectivity to light rays when subjected to heating. When conventional lamp reflectors of resin body type are used under high temperature conditions, there is a tendency that the outer surface of the reflective metal film gradually becomes cloudy and assumes a rainbow-like appearance, and sometimes the clouding proceeds to such an extent that the metal film surface whitens over a large area. Similarly to the blistering phenomenon, the whitening phenomenon is presumed to be attributed to moisture and/or other low molecular weight matter remaining in the resin body of the reflector. In contrast, lamp reflectors produced by utilizing the present invention do not suffer from the whitening phenomenon. Therefore, lamp reflectors according to the invention are quite suitable to automobile head lamp units or other lamp units in which the temperature becomes relatively high when the lamp is lighted.

The invention will further be illustrated by the following examples and experiments.

PREPARATION OF POLYPHOSPHATES

For use in the following examples, silicon polyphosphate was prepared based on the disclosure of Japanese patent application Primary Publication No. 56(1981)-50159.

First a granular silica gel was prepared by dropping commercially available sodium silicate ($Na_2O$ 129 g/l, $SiO_2$ 370 g/l) into 10% aqueous solution of sulfuric acid kept heated at 90° C. to thereby cause reaction under an acidic condition. The granular silica gel was well washed to remove sodium ions and sulfate ions until the content of sodium ions in the washing became practically zero. After washing the silica gel was left in a wet state, i.e. in the state of silica hydrogel, containing 92.5% of water.

The silica hydrogel was mixed with a commercial phosphoric acid (85% $H_3PO_4$, specific gravity 1.69) in such a proportion that the mole ratio $P_2O_5/SiO_2$ in the mixture became 0.33. Then the mixture was concentrated to obtain a dry solid. The dry solid was pulverized into particles that passed through a 200-mesh sieve, and these particles were dried at about 200° C. for 10 hr and then fired at 950° C. for 1 hr. The product of this process was silicon polyphosphate in particulate form, which was sieved to use only particles that passed through a 200-mesh sieve. The product of this process will be referred to as polyphosphate P-1.

A different silicon polyphosphate, which will be referred to as polyphosphate P-2, was prepared by repeating the above described process of preparing the polyphosphate P-1 almost identically except that the proportion of the phosphoric acid to the silica hydrogel was varied such that the mole ratio $P_2O_5/SiO_2$ in the resultant mixture was 0.5.

Besides the polyphosphates P-1 and P-2, a commercially available sodium silicon polyphosphate, a still different and commercially available silicon polyphosphate and a commercially available aluminum polyphosphate, which were all prepared based on the disclosure of the aforementioned Japanese specification No. 56-50159, were employed as polyphosphates P-3, P-4 and P-5, respectively. In both the polyphosphates P-3 and P-4, the mole ratio $P_2O_5/SiO_2$ was 0.33. In the polyphosphate P-5, the mole ratio $P_2O_5/Al_2O_3$ was 0.4

EXAMPLE 1

The thermosetting resin used in this example was a novolak-type phenolic resin powder, and the phosphate was the above described silicon polyphosphate P-1. In a Henschel mixer preheated to about 70° C., 5 kg of the phenolic resin powder, 1 kg of the polyphosphate P-1, 1.5 kg of chopped strands of carbon fiber and 2.5 kg of glass powder jointly employed as filler, and 100 g of zinc stearate were blended together and thoroughly mixed. The resultant hot mixture was soon transferred into another Henschel mixture which had been maintained at room temperature, and the mixture was subjected to further kneading while the temperature of the mixture gradually lowered. This process gave a granular molding composition which weighed about 10 kg.

This molding composition was subjected to injection molding under the following conditions to produce test pieces which were each in the shape of a disc 100 mm in diameter and 4 mm in thickness and 1.6 g/cm³ in density.

| Mold Temperature | 190° C. |
| --- | --- |
| Cylinder Temperature | |
| Forward Section | 90° C. |
| Rear Section | 50° C. |
| Injection Pressure | 1000 kgf/cm² |
| Revolutions of Screw | 56 rpm |
| Curing Time | 90 sec |

The test pieces were processed to sample reflectors by the following process.

First a base coat material was prepared by mixing a polyester varnish with an isocyanate such that the mole ratio of isocyanate group to hydroxy group NCO/OH in the mixture became 1/1. This mixture was applied to a major surface of each test piece by a spray coating method so as to form a base coat film having a thickness of about 10 μm, followed by baking at 180° C. for about 1 hr. Next, an aluminum film having a thickness of about 0.1 μm was deposited on the base coat by vacuum evaporation which was performed in a vacuum of about $4 \times 10^{-5}$ mmHg by using a conventional vacuum evaporation apparatus. After that a clear paint of acryl-melamine base was applied onto the deposited metal film by a spray coating method in order to form a top coat layer, which was baked at 80° C. for about 30 min.

At room temperature the sample reflectors were subjected to measurement of reflectivity to visible light rays and bending strength. Then the reflectors were heated for 2 hr in an oven maintained at 200° C. and thereafter left to cool down to room temperature (about 20° C.). After the heat treatment, the sample reflectors were carefully observed to examine whether they underwent heat distortion or not and whether any blistering phenomenon occurred or not, but neither heat distortion nor blistering phenomenon was recognized in the tested reflectors. Then the dimensions, weight, reflectivity and bending strength of these reflectors were measured again to calculate the degrees of changes caused by the heat treatment. The results are presented in the following Table 1, together with corresponding data obtained in the succeeding Examples 2 and 3 and References 1-3.

REFERENCE 1

A molding composition was prepared generally in accordance with Example 1 except that the polyphosphate P-1 (1 kg) in Example 1 was replaced by 1.5 kg of glass powder, so that 4 kg of glass powder was used in this example. This molding composition was shaped and processed into sample reflectors by the process described in Example 1, and the reflectors were tested in the same manner as in Example 1. The test results are shown in Table 1. After the heat treatment at 200° C. no heat distortion was observed in the sample reflectors, but blistering was observed in the entire area of every sample.

EXAMPLE 2

The thermosetting resin used in this example was a resol-type phenolic resin powder, and the phosphate was the silicon polyphosphate P-2. In a Henshcel mixer preheated to 80° C., 5 kg of the phenolic resin powder, 5 kg of the polyphosphate P-2, 1 kg of calcium carbonate and 2 kg of mica jointly employed as filler, and 100 g of zinc stearate were blended together and thoroughly mixed. The resultant hot mixture was kneaded in another Henschel mixer maintained at room temperature in the manner as described in Example 1. The product of this process was about 13 kg of a granular molding composition.

This molding composition was subjected to injection molding to produce test pieces which were each in the shape of a disc 100 mm in diameter, 4 mm in thickness and 1.5 g/cm³ in density. The molding conditions were as described in Example 1 except that the mold temperature was 180° C., that the injection pressure was 1100 kgf/cm² and that the curing time was 120 sec.

The test pieces were processed into sample reflectors by the method described in Example 1, and these reflectors were tested in the same manner as in Example 1. The test results are shown in Table 1. After the heat treatment at 200° C. neither heat distortion nor blistering was observed in the tested reflectors.

REFERENCE 2

A molding composition was prepared generally in accordance with Example 2 except that the polyphosphate P-2 (5 kg) in Example 2 was replaced by 5 kg of calcium carbonate, so that 6 kg of calcium carbonate was used in this example. By using this molding composition sample reflectors were produced by the process described in Example 1, and the reflectors were tested in the same manner as in Example 1. The test results are shown in Table 1. After the heat treatment at 200° C. no heat distortion was observed in the sample reflectors, but blistering was observed in the entire area of every sample.

EXAMPLE 3

The thermosetting resin used in this example was a premix of a novolak-type phenoric resin which contained hexamethylenetetramine amounting to 16% by weight of the phenolic resin, and the phosphate was the sodium silicon polyphosphate P-3. In a Henschel mixer, 5 kg of the phenolic resin premix in powder form, 2.5 kg of the polyphosphate P-3, 2.5 kg of glass powder and 2.5 kg of chopped strands of carbon fiber jointly employed as filler, and 100 g of zinc stearate were blended and thoroughly mixed. The resultant mixture was kneaded by means of rolls. The kneaded composition was cooled to room temperature and crushed to obtain about 12.5 kg of a particulate molding composition.

This molding composition was subjected to injection molding under the same molding conditions as in Example 1 to produce test pieces which were in the shape of a disc 100 mm in diameter, 4 mm in thickness and about 1.6 g/cm³ in density.

The test pieces were processed into sample reflectors by the method described in Example 1, and these reflectors were tested in the same manner as in Example 1. The test results are shown in Table 1. After the heat treatment at 200° C. neither heat distortion nor blistering was observed in the tested reflectors.

REFERENCE 3

A molding composition was prepared generally in accordance with Example 3 except that the quantity of the polyphosphate P-3 was decreased to 300 g and that the quantity of the glass powder was increased to 4.7 kg. By using this molding composition sample reflectors were produced by the process described in Example 1, and the reflectors were tested in the same manner as in Example 1. The test results are shown in Table 1. After the heat treatment at 200° C. no heat distortion was observed in the sample reflectors, but blistering was observed in the entire area of every sample.

TABLE 1

| Sample | Reflectivity (%) before heating | Reflectivity (%) after heating | Bending Strength (kg/mm²) before heating | Bending Strength (kg/mm²) after heating | Dimensional Change (%) | Weight Change (%) |
|---|---|---|---|---|---|---|
| Ex. 1 | 86.1 | 85.9 | 9.8 | 7.8 | −0.30 | −0.12 |
| Ref. 1 | 86.0 | * | 9.3 | 7.0 | −0.44 | −0.51 |
| Ex. 2 | 87.1 | 86.7 | 9.2 | 7.7 | −0.36 | −0.14 |
| Ref. 2 | 87.3 | * | 9.5 | 7.1 | −0.51 | −0.49 |
| Ex. 3 | 85.1 | 84.6 | 9.2 | 7.2 | −0.33 | −0.15 |
| Ref. 3 | 84.9 | * | 9.0 | 6.8 | −0.48 | −0.53 |

*impossible to measure because of blistering

EXAMPLES 4-9

In each of Examples 4-9, a molding composition was prepared by the process described in Example 1. The thermosetting resin was a novolak-type phenolic resin in Examples 4-6, an unsaturated polyester resin containing diallyl phthalate as cross-linking agent in Example 7, and a resol-type phenolic resin in Examples 8 and 9. The phosphate was selected from the polyphosphates P-1, P-2, P-3, P-4 and P-5, and the filler was selected from carbon fiber, glass powder, graphite powder, calcium carbonate, mica and silica in combinations as shown in the following Table 2. In every example, zinc stearate amounting to 2% by weight of the total of the essential ingredients was added as internal mold release agent.

The molding compositions prepared in Examples 4-9 were individually subjected to injection molding under the same molding conditions as in Example 1 to produce the disc-shaped test pieces described in Example 1. The test pieces were processed into sample reflectors by the method described in Example 1, and these reflectors were tested in the same manner as in Example 1. The test results are presented in Table 2. After the heat treatment at 200° C. neither heat distortion nor blistering was observed in the tested reflectors of Examples 4-9.

TABLE 2

| Sample | Thermo-setting Resin (parts by wt.) | Poly-phosphate (parts by wt.) | Filler (parts by wt.) | Reflectivity (%) before heating | Reflectivity (%) after heating | Bending Strength (kg/mm$^2$) before heating | Bending Strength (kg/mm$^2$) after heating | Dimensional Change (%) | Weight Change (%) |
|---|---|---|---|---|---|---|---|---|---|
| Ex. 4 | NP: 100 | P-1: 20 | CF: 50 GP: 50 | 84.7 | 82.4 | 8.8 | 7.1 | −0.24 | −0.18 |
| Ex. 5 | NP: 100 | P-4: 50 | CF: 50 GP: 50 | 86.2 | 85.1 | 8.6 | 6.9 | −0.25 | −0.19 |
| Ex. 6 | NP: 100 | P-5: 70 | CF: 50 GP: 50 | 87.1 | 85.7 | 8.1 | 6.8 | −0.20 | −0.14 |
| Ex. 7 | UP: 100 | P-2: 20 | GR: 50 GP: 50 | 85.9 | 84.2 | 7.9 | 6.5 | −0.24 | −0.16 |
| Ex. 8 | RP: 100 | P-1: 20 | MA: 20 CA: 20 | 87.1 | 85.6 | 7.4 | 6.6 | −0.30 | −0.13 |
| Ex. 9 | RP: 100 | P-3: 20 | SI: 20 CA: 20 | 86.5 | 85.0 | 7.2 | 6.7 | −0.29 | −0.20 |

NP: novolak-type phenol
RP: resol-type phenol
UP: unsaturated polyester
CF: carbon fiber
GP: glass powder
GR: graphite powder
MA: mica
CA: calcium carbonate
SI: silica

EXAMPLES 10–13

In Examples 10–13, molding compositions according to the invention were prepared by alternately using two kinds of commercially available resol-type phenolic resins in powder form, R-1 and R-2, of which the properties were as shown in Table 3.

TABLE 3

| Resin | Flow (mm at 125° C.) | Gel Time (sec at 150° C.) | M.P. (°C.) |
|---|---|---|---|
| R-1 | 81 | 74 | 69 |
| R-2 | 73 | 62 | 84 |

As the phosphate, selection was made from the polyphosphates P-1, P-2 and P-3, and the filler was selected from carbon fiber, glass powder, calcium carbonate, mica and silica in combinations as shown in the following Table 4. In every example, calcium stearate amounting to 3% by weight of the total of the essential ingredients was added as internal mold release agent, and calcium hydroxide amounting to 4% of the total of the essential ingredients was added as a curing promoter. In each example all the ingredients were blended together and thoroughly mixed in a Henschel mixer, and the resultant mixture was kneaded at 100° C. for 10 min by means of rolls having no plating on the surfaces. At the end of the kneading operation, the flow property of the composition measured by the disc method had reached a diameter value of about 120 mm. The kneaded composition was crushed to obtain particles that passed through a sieve having 2 mm openings.

The flow properties of the molding compositions prepared in Examples 10–13 were measured by the following three methods. The results are presented in Table 4.

(1) Spiral Flow Method

Figure 2:
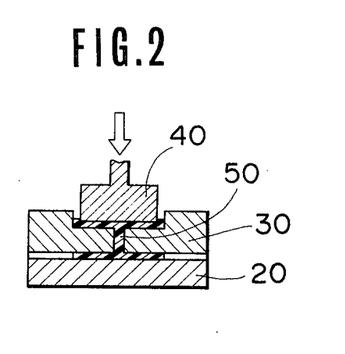
FIG. 2 is a schematic and sectional view of a mold assembly for spiral flow testing of molding compositions.
Figure 3:
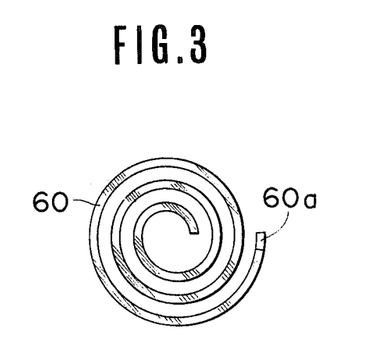
FIG. 3 is a plan view of a sample molding shaped by using the mold assembly of FIG. 2.

FIG. 2 shows a die set used in this testing method. Indicated at 20 is a lower die which is formed with a spiral cavity in its upper face. In the testing, 50 g of sampled molding composition 50 was put into the cavity of the upper die 30 and heated to 165° C. Then the composition 50 was forced into the spiral cavity in the lower die 20 by the application of a compression pressure of 150 kg/cm$^2$ via a punch 40. FIG. 3 shows a spirally-shaped molding 60 obtained by this molding method. In some cases, the molding 60 had whitened in its outer end portion 60a. The flow property of the tested molding composition 50 was indicated by the outer diameter of the spiral molding 60 measured by disregarding the whitened portion 60a.

(2) Disc Method

Based on the testing method specified in JIS (Japanese Industrial Standard) K 6911, 5 g of sampled molding composition was molded into a disc-shaped body by application of a pressure of 25 kg/cm$^2$ to the composition heated to 160° C. The outer diameter of the disc-shaped molding was measured as an indication of the flow property of the tested molding composition.

(3) Extrusion Method

Using an extrusion flow tester for plastic materials, 1.2 g of sampled molding composition was subjected to extrusion at 100° C. by applying a pressure of 300 kg/cm$^2$ via a plunger. During the extrusion, the maximum velocity of the softened sample flowing out of the orifice was measured.

REFERENCES 4–7

As References 4–7, four differently composed molding compositions were prepared by using the materials described in Examples 10–13. As shown in Table 4, in these references the amount of the polyphosphate and/or the amount of the filler was increased such that the total of the polyphosphate and the filler in each composition became more than 250% by weight of the thermosetting resin.

The flow properties of the molding compositions of References 4–7 were measured by the above described three methods. The results are shown in Table 4.

TABLE 4

| Sample | Thermo-setting Resin (parts by wt.) | Poly-phosphate (parts by wt.) | Filler (parts by wt.) | Spiral Flow (mm) | Disc (mm) | Extrusion (mm/sec) |
|---|---|---|---|---|---|---|
| Ex. 10 | R-1: 100 | P-1: 50 | CF: 50 GP: 50 | 585 | 121 | 0.31 |
| Ex. 11 | R-2: 100 | P-2: 150 | MA: 50 GP: 50 | 520 | 123 | 0.27 |

TABLE 4-continued

| Sample | Thermo-setting Resin (parts by wt.) | Poly-phosphate (parts by wt.) | Filler (parts by wt.) | Flow Properties Spiral Flow (mm) | Disc (mm) | Extrusion (mm/sec) |
|---|---|---|---|---|---|---|
| Ex. 12 | R-1: 100 | P-3: 150 | CF: 20 CA: 20 | 610 | 130 | 0.41 |
| Ex. 13 | R-2: 100 | P-1: 200 | CF: 20 SI: 10 | 375 | 115 | 0.20 |
| Ref. 4 | R-1: 100 | P-1: 250 | CF: 20 GP: 20 | 310 | 70 | 0.16 |
| Ref. 5 | R-2: 100 | P-2: 100 | CF: 100 CA: 80 | 285 | 81 | 0.13 |
| Ref. 6 | R-1: 100 | P-1: 100 | MA: 100 GP: 80 | 185 | 77 | 0.11 |
| Ref. 7 | R-2: 100 | P-1: 100 | CF: 100 SI: 100 | 165 | 71 | 0.09 |

CF: carbon fiber
MA: mica
SI: silica
GP: glass powder
CA: calcium carbonate

A molding composition is considered to be suitable for injection molding when the above described testing methods give the following values.

Spiral Flow Method: 300–700 mm
Disc Method: 100–130 mm
Extrusion Method: 0.2–1 mm/sec From the test results shown in Table 4 it is understood that the molding compositions of References 4–7 are not suited to injection molding and that the unsatisfactory flow properties of these molding compounds are attributed to the use of excessively large amounts of the polyphosphate and filler relative to the thermosetting resin.

EXAMPLE 14

Figure 1:
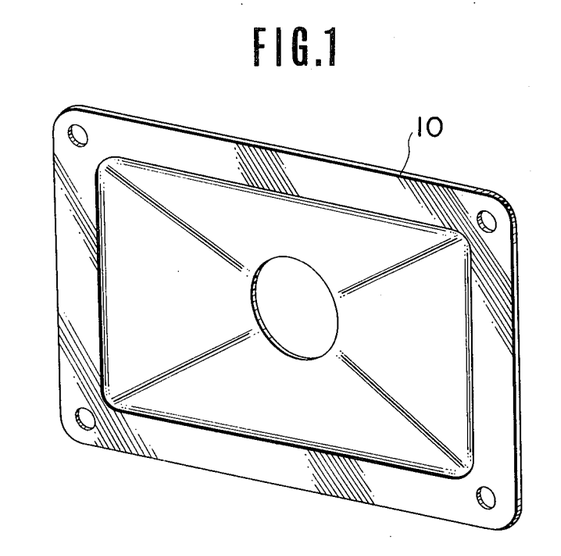
FIG. 1 is a perspective view of a reflector for an automotive head lamp, which can be produced by using a molding composition according to the invention.

The body of a lamp reflector of the shape as shown in FIG. 1 for an automobile head lamp unit was formed by injection molding of the granular molding composition prepared in Example 1. This reflector body was processed into the reflector 10 by sequentially providing the base coat, aluminum film by vacuum deposition and top coat to the reflector body by the methods employed in Example 1 to produce the sample reflectors.

After measurement of the weight, dimensions and reflectivity to the visible light rays, the reflector 10 was kept heated at 180° C. for 6 hr. After this heat treatment neither heat distortion nor blistering was observed in the reflector, and it was confirmed that the heat treatment produced no change in the reflectivity of this reflector though the weight of the reflector decreased by 0.15%. Then the same reflector was kept heated at 200° C. for 2 hr, but neither heat distortion nor blistering was observed in the reflector after the second heat treatment, and the reflectivity of the reflector remained still unchanged. By the second heat treatment the decrease in the weight of the reflector reached 0.18%.

The results of the tests on the reflector of this example demonstrate that moldings produced by using a molding composition according to the invention liberate practically no gases or only very small amounts of gases even when used at considerably high temperatures.

EXAMPLE 15

In a Henschel mixer, 1 kg of the resol-type phenolic resin powder used in Example 2, 300 g of the silicon polyphosphate P-1, 500 g of glass powder and 500 g of chopped strands of carbon fiber jointly employed as filler, and 20 g of zinc stearate were blended together and mixed thoroughly to obtain a molding composition.

By using a hot press and a metal mold preheated to 180° C., 100 g of the molding composition was press-shaped by application of a pressure of 500 kg/cm² for 5 min into a square sheet 100 mm×100 mm wide and 5.9 mm thick. The density of this sheet was about 1.7 g/cm³. To use as test pieces, a plurality of sheets were formed in the same manner.

The test pieces were processed to sample reflectors by the following process. First a polyurethane base paint was applied to a major surface of each test piece by a spray coating method so as to form a base coat film having a thickness of about 10 μm, followed by baking at 180° C. for about 1 hr. Next, an aluminum film having a thickness of about 0.1 μm was deposited on the base coat by vacuum evaporation which was performed in a vacuum of about $3 \times 10^{-5}$ mmHg by using a conventional apparatus. After that a clear paint of polyurethane base was applied onto the aluminum film by a spray coating method in order to form a top coat layer, which was baked at 80° C. for about 30 min.

The sample reflectors were tested in the same manner as in Example 1. The test results are shown in the following Table 5, together with corresponding data obtained in the succeeding Examples 16 and 17 and References 8–10. After the heat treatment at 200° C. neither heat distortion nor blistering, nor whitening, was observed in the sample reflectors produced in this example.

REFERENCE 8

A molding composition was prepared generally in accordance with Example 15 except that the polyphosphate P-1 (300 g) in Example 15 was replaced by 300 g of glass powder, so that 800 g of glass powder was used in this case. By using this molding composition sample reflectors were produced by the process described in Example 15, and the reflectors were tested in the same manner as in Example 1. The test results are shown in Table 5. After the heat treatment at 200° C. no heat distortion was observed in the sample reflectors, but both blistering and whitening were observed in the entire area of every sample.

EXAMPLE 16

In a Henschel mixer maintained at about 60° C., 1 kg of a novolak-type phenolic resin powder, 500 g of the silicon polyphosphate P-2, 1 kg of calcium carbonate and 500 g of mica jointly employed as filler, and 20 g of zinc stearate were blended together and mixed thoroughly. The resultant hot mixture was soon transferred into another Henschel mixer which had been maintained at room temperature, and the mixture was kneaded while the temperature of the mixture gradually lowered. This process gave a granular molding composition.

This molding composition was subjected to press molding in the same manner as in Example 16, except that the metal mold temperature was raised to 200° C., to produce test pieces in the form of a square sheet 100 mm×100 mm wide and 5.9 mm thick. The density of the test piece was about 1.7 g/cm³. The test pieces were processed into sample reflectors by the process described in Example 15, and the reflectors were tested in the same manner as in Example 1. After the heat treatment at 200° C. neither heat distortion nor blistering, nor whitening, was observed in the tested reflectors.

REFERENCE 9

A molding composition was prepared generally in accordance with Example 16 except that the quantity of the polyphosphate P-2 was decreased to 40 g and that the quantity of mica was increased to 960 g. By using this molding composition sample reflectors were produced by the process described in Example 15, and the reflectors were tested in the same manner as in Example 1. After the heat treatment at 200° C. no heat distortion was observed in the sample reflectors, but blistering was observed in the entire area of every sample and, besides, whitening was observed in some areas of the respective samples.

EXAMPLE 17

In a Henschel mixer maintained at about 70° C., 5 kg of the novolak-type phenolic resin used in Example 3, 1.5 kg of the silicon polyphosphate P-1, 2.5 kg of chopped strands of glass fiber and 3.5 kg of glass powder jointly employed as filler, and 100 g of zinc stearate were blended together and mixed thoroughly. The resultant hot mixture was kneaded in another Henschel mixer in the manner as described in Example 16 to obtain a granular molding composition, which weighed about 10 kg.

This molding composition was subjected to injection molding to produce test pieces each in the shape of a disc 100 mm in diameter, 4 mm in thickness and about 1.6 g/cm$^3$ in density. The molding conditions were as described in Example 1 except that the curing time was 60 sec. The test pieces were processed into sample reflectors by the process described in Example 15, and the reflectors were tested in the same manner as in Example 1. After the heat treatment at 200° C. neither heat distortion nor blistering, nor whitening, was observed in the tested reflectors.

REFERENCE 10

A molding composition was prepared generally in accordance with Example 17, except that the polyphosphate P-1 (1.5 kg) in Example 17 was replaced by 1.5 kg of glass powder, so that 5 kg of glass powder was used in this case. By using this molding composition sample reflectors were produced by the same process as in Example 17, and the reflectors were tested in the same manner as in Example 1. After the heat treatment at 200° C. no heat distortion was observed in the sample reflectors, but both blistering and whitening were observed in the entire area of every sample.

TABLE 5

| Sample | Reflectivity (%) before heating | Reflectivity (%) after heating | Bending Strength (kg/cm$^2$) before heating | Bending Strength (kg/cm$^2$) after heating | Dimensional Change (%) | Weight Change (%) |
|---|---|---|---|---|---|---|
| Ex. 15 | 87.5 | 87.1 | 11.3 | 8.5 | −0.15 | −0.097 |
| Ref. 8 | 87.7 | * | 11.1 | 8.0 | −0.26 | −0.46 |
| Ex. 16 | 86.5 | 85.7 | 10.5 | 7.8 | −0.21 | −0.099 |
| Ref. 9 | 86.3 | * | 10.6 | 7.6 | −0.36 | −0.50 |
| Ex. 17 | 86.0 | 84.9 | 9.5 | 7.5 | −0.31 | −0.15 |
| Ref. 10 | 86.0 | * | 9.6 | 7.1 | −0.43 | −0.57 |

*impossible to measure because of blistering

EXAMPLES 18–23

In each of Examples 18–23, a molding composition was prepared by the process described in Example 16. The thermosetting resin was a novolak-type phenolic resin in Examples 18–20, an unsaturated polyester resin in Examples 21 and 22, and a resol-type phenolic resin in Example 23. The phosphate was selected from the polyphosphates P-1, P-2, P-3, P-4 and P-5, and the filler was selected from carbon fiber, glass powder, graphite powder, mica, calcium carbonate and silica in combinations as shown in the following Table 6. In every example, zinc stearate amounting to 2% by weight of the total of the essential ingredients was added as internal mold release agent.

The molding compositions prepared in Examples 18–23 were individually subjected to hot press molding in the manner as described in Example 16 to produce test pieces in the form of square sheet described in Example 16. The test pieces were processed into sample reflectors by the method described in Example 15, and these reflectors were tested in the same manner as in Example 1. The test results are presented in Table 6. After the heat treatment at 200° C. neither heat distortion nor blistering, nor whitening, was observed in the tested reflectors.

TABLE 6

| Sample | Thermosetting Resin (parts by wt.) | Polyphosphate (parts by wt.) | Filler (parts by wt.) | Reflectivity (%) before heating | Reflectivity (%) after heating | Bending Strength (kg/cm$^2$) before heating | Bending Strength (kg/cm$^2$) after heating | Dimensional Change (%) | Weight Change (%) |
|---|---|---|---|---|---|---|---|---|---|
| Ex. 18 | NP: 100 | P-3: 50 | CF: 50 / GP: 50 | 86.3 | 84.7 | 10.3 | 8.1 | −0.23 | −0.18 |
| Ex. 19 | NP: 100 | P-4: 30 | CF: 50 / GP: 50 | 86.1 | 84.9 | 10.1 | 8.0 | −0.21 | −0.14 |
| Ex. 20 | NP: 100 | P-5: 150 | CF: 50 / GP: 50 | 85.8 | 83.6 | 10.4 | 8.3 | −0.19 | −0.15 |
| Ex. 21 | UP: 100 | P-1: 30 | GR: 50 / GP: 50 | 86.8 | 83.9 | 9.1 | 6.8 | −0.31 | −0.17 |
| Ex. 22 | UP: 100 | P-2: 30 | MA: 50 / CA: 50 | 85.5 | 83.4 | 8.9 | 7.1 | −0.34 | −0.20 |
| Ex. 23 | RP: 100 | P-2: 30 | SI: 50 | 85.1 | 82.8 | 8.7 | 7.4 | −0.36 | −0.19 |

TABLE 6-continued

| Sample | Thermo-setting Resin (parts by wt.) | Poly-phosphate (parts by wt.) | Filler (parts by wt.) | Reflectivity (%) before heating | Reflectivity (%) after heating | Bending Strength (kg/cm$^2$) before heating | Bending Strength (kg/cm$^2$) after heating | Dimensional Change (%) | Weight Change (%) |
|---|---|---|---|---|---|---|---|---|---|
| | | | CA: 50 | | | | | | |

NP: novolak-type phenol
UP: unsaturated polyester
RP: resol-type phenol
MA: mica
SI: silica
CF: carbon fiber
GP: glass powder
GR: graphite powder
CA: calcium carbonate

EXAMPLE 24

The body of the reflector 10 shown in FIG. 1 for an automobile head lamp unit was formed by injection molding of the granular molding composition prepared in Example 17. This reflector body was processed into the reflector by sequentially providing the base coat, aluminum film by vacuum deposition and top coat to the reflector body by the methods employed in Example 15 to produce the sample reflectors.

After measurement of the weight, dimensions and reflectivity to the visible light rays, the reflector was kept heated at 180° C. for 6 hr. After this heat treatment neither heat distortion nor blistering, nor whitening, was observed in the reflector, and it was confirmed that the heat treatment produced no change in the reflectivity of this reflector though the weight of the reflector decreased by 0.15%. Then the same reflector was kept heated at 200° C. for 2 hr, but no heat distortion, no blistering and no whitening occurred in this reflector, and the reflectivity of the reflector remained still unchanged. By the second heat treatment the decrease in the weight of the reflector reached 0.18%.

What is claimed is:

1. A resin composition for injection molding, comprising:
   100 parts by weight of a thermosetting resin;
   from 5 to 250 parts by weight of a salt of an oxyacid of phosphorous wherein said salt comprises a polyphosphate expressed by the general formula MO$_{m/2}$·nP$_2$O$_5$, wherein M represents a metal element including silicon, m represents the valence of the metal element M and n is in the range of from 0.1 to 0.7, or an alkali metal salt of said phosphate; and
   from 15 to 245 parts by weight of a filler, the total amount of said salt of the oxyacid and said filler being in the range of from 20 to 250 parts by weight.

2. A resin composition according to claim 1, wherein n in the formula is in the range from 0.2 to 0.5.

3. A resin composition according to claim 1, wherein said phosphate is a polyphosphate selected from the group consisting of silicon polyphosphate, aluminum polyphosphate and boron polyphosphate.

4. A resin composition according to claim 1, wherein said thermosetting resin is selected from the group consisting of phenolic resins and unsaturated polyester resins.

5. A resin composition according to claim 1, wherein said filler is an inorganic filler.

6. A resin composition according to claim 5, wherein said filler comprises a filler material selected from the group consisting of clay, talc, glass, silica, alumina, magnesia, titania, calcium silicate, kieselguhr, calcium carbonate, graphite, carbon black, mica and metals.

7. A resin composition according to claim 5, wherein said filler comprises a filler material selected from the group consisting of glass fiber, glass powder, carbon fiber and carbon powder.

8. A resin composition according to claim 1, wherein the amount of said salt of the oxyacid is not smaller than 30 parts by weight.

9. A resin composition according to claim 8, wherein the amount of said salt of the oxyacid is in the range from 60 to 100 parts by weight.

10. A resin composition according to claim 1, wherein the total amount of said salt of the oxyacid and said filler is in the range from 120 to 180 parts by weight.

11. A resin composition according to claim 1, further comprising a mold release agent which amounts to 0.5 to 3% by weight of the total amount of said thermosetting resin, said salt of the oxyacid and said filler.

12. A resin composition according to claim 11, wherein said mold release agent is a metal stearate.

* * * * *